No. 760,621. PATENTED MAY 24, 1904.
E. A. GUY.
SHACKLE ROD CONNECTOR.
APPLICATION FILED APR. 29, 1903.
NO MODEL.

WITNESSES:
William L. David
Chas. E. Riordon

INVENTOR
Edward A. Guy
BY R. S. Caldwell
ATTORNEY

No. 760,621. Patented May 24, 1904.

UNITED STATES PATENT OFFICE.

EDWARD A. GUY, OF FINDLAY, OHIO.

SHACKLE-ROD CONNECTOR.

SPECIFICATION forming part of Letters Patent No. 760,621, dated May 24, 1904.

Application filed April 29, 1903. Serial No. 154,826. (No model.)

*To all whom it may concern:*

Be it known that I, EDWARD A. GUY, a citizen of the United States, residing at Findlay, in the county of Hancock and State of Ohio, have invented certain new and useful Improvements in Shackle-Rod Connectors, of which the following is a specification.

My invention relates to certain new and useful improvements in shackle-rod connectors, and has for its object to provide a device of this kind with such a construction that slipping of the shackle-rods in the connector and the consequent wear and weakening will be positively prevented and a strong tight joint produced.

In oil-well pumping especially, where distant pumps are operated from a central motive power with long lines of shackle-rods constituting the medium for the transmission of power, a strong and tight means for connecting the abutting ends of adjoining rods is necessary. Such a coupling means is required to resist the strong tendency of the rods to pull apart without weakening the rods themselves and without permitting the least play in the joint which would result in wear. It has therefore been my object to accomplish these results by forming a connector of two corresponding members having a pair of alining clamping-sockets, each provided with a double convex surface to form inner and outer shoulders to hold between them the bulbous ends of the shackle-rods and tightly clamp the same, the said members being bolted together along the line of meeting of the shackle-rod ends.

With the above and other objects in view my invention further consists in the novel details of construction and combinations of parts to be herein described, and set forth in the claims.

Figure 1:
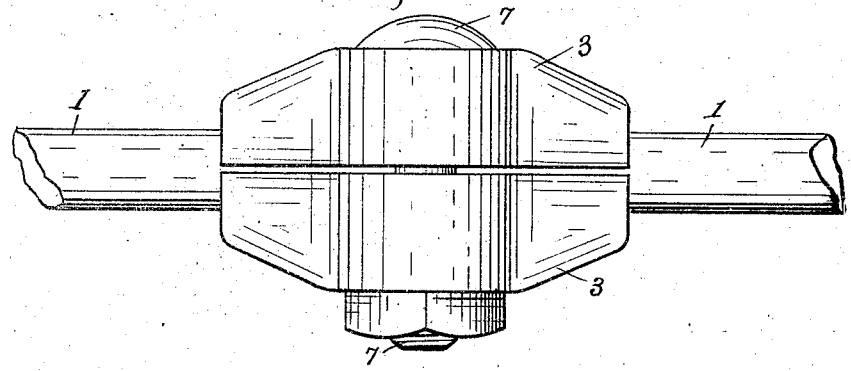
Figure 2:
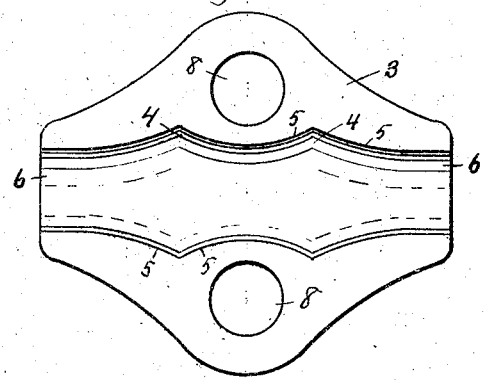
Figure 3:
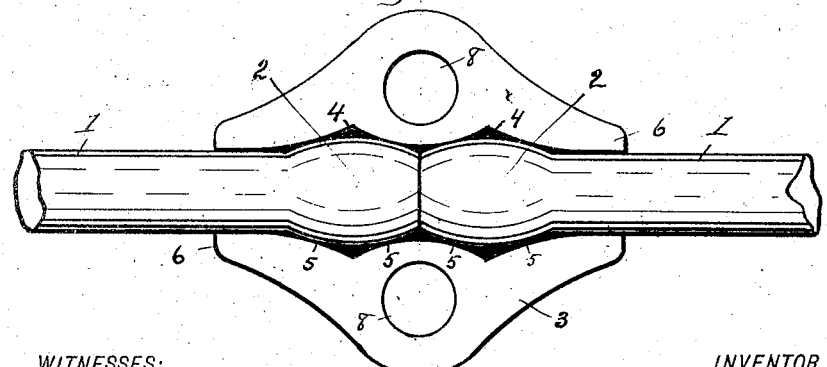

Referring to the accompanying drawings, forming a part of this description, and in which like characters of reference indicate same parts in the several views, Figure 1 is an elevation of a connector made in accordance with my invention. Fig. 2 is a plan view of one member thereof, and Fig. 3 is a plan view of one member of the connector with the shackle-rods in place.

In the drawings, 1 represents the shackle-rods, having their ends upset into enlargements or bulbous heads 2. The duplicate members 3 of the connector are formed with two alining clamping-sockets 4, each having double convex surfaces 5, forming inner and outer shoulders, said convex surfaces merging into tubular sleeves 6. The bulbous heads 2 are held within the clamping-sockets 4, with a bearing on each of the two shoulders 5 thereof, and the bolts 7, passing through openings 8 in alinement with the meeting ends of the shackle-rods, when tightened securely clamp the bulbous heads of the shackle-rods in the clamping-sockets, said clamping-sockets being of such depth that the faces of the two members will not come into contact with each other. In this manner each of the shackle-rods is rigidly clamped to the connector without any "play" or "loose movement," and the location of the bolts 7 along the line of meeting of the rod ends serves to divide the clamping pressure equally between the two clamping-sockets.

Having fully described my invention, what I claim as new, and desire to secure by Letters Patent, is—

1. A shackle-rod connector comprising a pair of members having alining clamping-sockets with inner and outer shoulders to bear on opposite ends of an enlargement on the end of each of the shackle-rods, and bolts connecting the two members and located in alinement with the joint between the shackle-rod ends.

2. In a device of the character described, a pair of members having alining clamping-sockets each with double convex surfaces, tubular sleeves merging therefrom, a pair of shackle-rods provided with enlarged ends seated in the clamping-sockets and bearing on the inner and outer shoulders formed by the double convex surfaces, and means for pressing the members together.

3. In a device of the character described, a pair of members having clamping-sockets each with double convex surfaces, tubular sleeves merging therefrom, a pair of shackle-rods having enlarged bulbular ends seated in the clamping-sockets and bearing on the inner and outer shoulders formed by the double convex surfaces, and bolts connecting the members on opposite sides of the rod ends and in alinement with the abutting ends thereof.

In testimony whereof I affix my signature in presence of two witnesses.

EDWARD A. GUY.

Witnesses:
WILLIAM L. DAVID,
T. GLEN CARPENTER.